(12) United States Patent
Azuma

(10) Patent No.: US 12,084,376 B2
(45) Date of Patent: Sep. 10, 2024

(54) METHOD FOR MANUFACTURING GLASS SUBSTRATE AND METHOD FOR MANUFACTURING MAGNETIC DISK

(71) Applicant: HOYA CORPORATION, Tokyo (JP)

(72) Inventor: Shuhei Azuma, Hung Yen (VN)

(73) Assignee: HOYA CORPORATION, Tokyo (JP)

( * ) Notice: Subject to any disclaimer, the term of this patent is extended or adjusted under 35 U.S.C. 154(b) by 524 days.

(21) Appl. No.: 17/263,019

(22) PCT Filed: Jul. 26, 2019

(86) PCT No.: PCT/JP2019/029530
§ 371 (c)(1),
(2) Date: Jan. 25, 2021

(87) PCT Pub. No.: WO2020/022510
PCT Pub. Date: Jan. 30, 2020

(65) Prior Publication Data
US 2021/0230042 A1 Jul. 29, 2021

(30) Foreign Application Priority Data
Jul. 27, 2018 (WO) .................. PCT/JP2018/028269

(51) Int. Cl.
*C03B 33/02* (2006.01)
*B23K 26/53* (2014.01)
(Continued)

(52) U.S. Cl.
CPC ......... *C03B 33/0222* (2013.01); *B23K 26/53* (2015.10); *C03B 33/04* (2013.01); *C03C 19/00* (2013.01)

(58) Field of Classification Search
None
See application file for complete search history.

(56) References Cited

U.S. PATENT DOCUMENTS 6,829,910 B1   12/2004   Hsieh et al.
2002/0041946 A1   4/2002   Abe
(Continued)

FOREIGN PATENT DOCUMENTS

CN   104690428 A   6/2015
CN   106098085 A   11/2016
(Continued)

OTHER PUBLICATIONS

CN 110312590 machine translation, Cheng et al., A processing method, device, and system of hard and brittle products, Oct. 2019 (Year: 2019).*

(Continued)

*Primary Examiner* — Queenie S Dehghan
(74) *Attorney, Agent, or Firm* — Global IP Counselors, LLP

(57) ABSTRACT

A method for manufacturing a glass substrate including an opening includes forming lines of inner and outer circumferential portions irradiated with a laser beam along substantially concentric circles in a surface of a glass blank, separating a portion on an inner side of the line of the outer circumferential portion of the glass blank and a portion on an outer side of the line of the outer circumferential portion from each other by heating the portion on the outer side of the line of the outer circumferential portion with radiant heat, and separating a portion on an inner side of the line of the inner circumferential portion of the glass blank and a portion on an outer side of the line of the inner circumferential portion from each other by heating the portion on the outer side of the line of the inner circumferential portion with radiant heat.

20 Claims, 3 Drawing Sheets

(51) Int. Cl.
    *C03B 33/04* (2006.01)
    *C03C 19/00* (2006.01)

(56) References Cited

U.S. PATENT DOCUMENTS

| | | |
|---|---|---|
| 2015/0118522 A1 | 4/2015 | Hosseini |
| 2015/0136743 A1 | 5/2015 | Hosseini |
| 2015/0262604 A1 | 9/2015 | Hosseini |
| 2017/0140785 A1 | 5/2017 | Takahashi et al. |
| 2018/0134606 A1 | 5/2018 | Wagner et al. |
| 2018/0141154 A1 | 5/2018 | Oogushi et al. |
| 2019/0144325 A1* | 5/2019 | Bowden ................ B23K 26/53 219/121.69 |
| 2019/0221233 A1 | 7/2019 | Takahashi et al. |

FOREIGN PATENT DOCUMENTS

| | | |
|---|---|---|
| JP | 2002060235 A | 2/2002 |
| JP | 2003252638 A | 9/2003 |
| JP | 2015067494 A | 4/2015 |
| JP | 2015083320 A | 4/2015 |
| JP | 2015129076 A | 7/2015 |
| JP | 2016-221557 A | 12/2016 |
| WO | 2020163995 A1 | 8/2020 |

OTHER PUBLICATIONS

International Search Report in PCT/JP2019/029530 dated Oct. 15, 2019.

\* cited by examiner

METHOD FOR MANUFACTURING GLASS SUBSTRATE AND METHOD FOR MANUFACTURING MAGNETIC DISK

CROSS-REFERENCE TO RELATED APPLICATIONS

This U.S. National stage application of International Patent Application No. PCT/JP2019/029530, filed on Jul. 26, 2019, which, in turn, claims priority to International Patent Application No. PCT/JP2018/028269, filed on Jul. 27, 2018. The entire content of International Patent Application No. PCT/JP2018/028269 is hereby incorporated herein by reference.

BACKGROUND

Field of the Invention

The present invention relates to a method for manufacturing a glass substrate in which shape processing is performed using a laser beam to manufacture the glass substrate, and a method for manufacturing a magnetic disk.

Background Information

Nowadays, hard disk apparatuses are used to record data in personal computers, notebook-sized personal computers, DVD (Digital Versatile Disc) recording apparatuses, data centers for cloud computing, and the like. A magnetic disk obtained by providing a magnetic layer on a glass substrate for a magnetic disk, which is a disk-shaped non-magnetic material, is used in a hard disk apparatus. The magnetic disk is incorporated into a DFH (Disk Flying Height) type magnetic head that has a flying height of about 5 nm, for example.

In such a DFH type magnetic head, the flying height is short, and accordingly the attachment of minute particles etc., to main surfaces of the magnetic disk is to be avoided. In order to suppress the attachment of minute particles, it is desirable that not only the main surfaces of a glass substrate but also the edge surfaces of the glass substrate have a small surface roughness.

A technology (JP 2015-083320A) for efficiently manufacturing a glass substrate for a magnetic disk is known with which the surface roughness of an inner edge surface of the glass substrate is reduced to satisfy such requirements for magnetic disks.

Specifically, a focal line of a pulsed laser beam is directed to a plurality of positions within the substrate so that the pulsed laser beam is absorbed by the glass substrate at the plurality of positions and a defect line constituted by through-holes is formed on a predetermined first path. Furthermore, the glass substrate is heated along the first path to cause cracks to develop and separate a portion on an inner side of the first path from the glass substrate. Furthermore, the portion on the inner side is heated to take out the portion from the glass substrate.

SUMMARY

With the technology described above, the portion on the inner side of the first path can be separated from the glass substrate by heating the glass substrate along the first path to cause cracks to develop, but the portion on the inner side cannot be sufficiently stably taken out from the glass substrate by heating the portion. For example, after the defect is formed using the laser, when the glass substrate is heated along the first path to cause cracks to develop and separate the portion on the inner side of the first path from the glass substrate, sometimes a portion separated by a crack is bonded again with heat and cannot be securely separated, and it was found that in such a case, the portion bonded again cannot be separated even if the portion on the inner side is heated.

Therefore, it has been difficult to efficiently manufacture a glass substrate having an inner edge surface of which surface roughness is reduced using a laser beam.

Also, the thicknesses of glass substrates have been reduced in recent years, and accordingly, cracking is likely to occur during processing, including separation that is performed through laser irradiation and heating. In view of this, it is desirable to securely manufacture a thin glass substrate.

Therefore, an object of the present invention is to provide a method for manufacturing a glass substrate in which a glass substrate having a predetermined shape can be securely separated and taken out from a glass blank from which the glass substrate is obtained, when shape processing of the glass blank is performed using a laser beam to reduce surface roughness of edge surfaces of the glass substrate, and a method for manufacturing a magnetic disk using the method for manufacturing a glass substrate.

An aspect of the present invention is a method for manufacturing a glass substrate that has an opening. The method includes:

forming an inner circumferential portion and an outer circumferential portion that are irradiated with a laser beam along substantially concentric circles in a surface of a glass blank from which the glass substrate is obtained;

separating a portion on an inner side of the outer circumferential portion of the glass blank and a portion on an outer side of the outer circumferential portion from each other by heating the portion on the outer side of the outer circumferential portion to cause thermal expansion of the portion on the outer side of the outer circumferential portion relative to the portion on the inner side of the outer circumferential portion and form a gap in the outer circumferential portion; and separating a portion on an inner side of the inner circumferential portion of the glass blank and a portion on an outer side of the inner circumferential portion from each other by heating the portion on the outer side of the inner circumferential portion to cause relative thermal expansion of the portion on the outer side of the inner circumferential portion and form a gap in the inner circumferential portion.

Another aspect of the present invention is a method for manufacturing a glass substrate. The method includes:

forming a defect on a line having a predetermined annular shape in a surface of a glass blank from which the glass substrate is obtained, by irradiating the line with a laser beam; and separating an outer portion and an inner portion of the glass blank from each other by heating the outer portion more than the inner portion, the outer portion and the inner portion being respectively on an outer side and an inner side of the line of the glass blank in which the defect has been formed.

Preferably, the glass substrate has an annular shape including an opening, in the forming of the defect, the defect is formed using the laser beam, taking the shape of an outer edge of the annular shape to be the predetermined shape, and in the separating of the outer portion and the inner portion from each other, first heating processing is performed in which a first outer portion of the glass blank is heated more than a first inner portion of the glass blank is, the first outer portion and the first inner portion being respectively on an outer side and an inner side of the outer edge of the annular shape.

Preferably, in the separating of the outer portion and the inner portion from each other, the first outer portion and the first inner portion are separated from each other with a length of 0.1% to 5% of an outer diameter of the annular shape left as a margin for the annular shape of the glass substrate.

Preferably, in the forming of the defect, the defect is formed using the laser beam, taking the shape of an inner edge of the annular shape including the opening to be the predetermined shape, and in the separating of the outer portion and the inner portion from each other, second heating processing is performed in which a second outer portion of the glass blank is heated more than a second inner portion of the glass blank is, the second outer portion and the second inner portion being respectively on an outer side and an inner side of the inner edge of the annular shape including the opening.

Preferably, the second heating processing is performed after the first heating processing when separating a portion that is formed into the glass substrate from the glass blank.

Another aspect of the present invention is a method for manufacturing a glass substrate. The method includes:

forming a defect on a line having a predetermined annular shape in a surface of a glass blank from which the glass substrate is obtained, by irradiating the line with a laser beam; and separating an outer portion and an inner portion of the glass blank from each other by heating the outer portion more than the inner portion, the outer portion and the inner portion being respectively on an outer side and an inner side of the line of the glass blank in which the defect has been formed, wherein the outer portion and the inner portion of the glass blank are separated from each other by simultaneously heating the outer portion from both main surface sides of the glass blank to heat the outer portion more than the inner portion, and the inner portion is removed to form the opening.

Preferably, in the separating of the outer portion and the inner portion from each other, the outer portion and the inner portion are separated from each other by making the temperature of the outer portion higher than the temperature of the inner portion to cause thermal expansion of the outer portion relative to the inner portion and form a gap along the line.

Preferably, irradiating the surface of the glass blank with the laser beam includes forming spot-like through-holes at a plurality of discrete points on the line using a pulsed laser beam, and thereafter emitting a non-pulsed laser beam while continuously moving an irradiation position along the line so as to connect the discrete points on the line.

Preferably, the non-pulsed laser beam is a non-pulsed $CO_2$ laser beam, for example.

Preferably, the heating includes heating both main surfaces of the glass blank with radiant heat from heat sources that are provided on both main surface sides of the glass blank.

Preferably, a ratio of the area of a main surface of the glass blank to the area of a main surface of the glass substrate is 101% to 160%, and in the separating of the outer portion and the inner portion from each other, the single glass substrate is taken out from the single glass blank.

Preferably, the glass blank has a thickness not larger than 0.6 mm.

Another aspect of the present invention is a method for manufacturing a magnetic disk including manufacturing a magnetic disk by forming at least a magnetic layer on the glass substrate manufactured using the above-described method for manufacturing a glass substrate.

According to the method for manufacturing a glass substrate and the method for manufacturing a magnetic disk described above, a glass substrate having a predetermined shape can be securely separated and taken out from a glass blank.

DETAILED DESCRIPTION OF THE EMBODIMENTS

The following describes details of a method for manufacturing a glass substrate and a method for manufacturing a magnetic disk. As a material of the glass substrate, aluminosilicate glass, soda-lime glass, borosilicate glass, or the like can be used. In particular, amorphous aluminosilicate glass can be preferably used from the standpoint that chemical strengthening can be performed as necessary and a glass substrate for a magnetic disk that has high strength and includes main surfaces having a high degree of flatness can be manufactured.

Overview of Method for Manufacturing Glass Substrate

A method for manufacturing a glass substrate according to an embodiment includes:

(A) forming a defect on a line having a predetermined annular shape in a surface of a glass blank from which the glass substrate is obtained, by irradiating the line with a laser beam; and (B) separating an outer portion and an inner portion of the glass blank from each other by heating the outer portion more than the inner portion, the outer portion and the inner portion being respectively on an outer side and an inner side of the line of the glass blank in which the defect has been formed.

Forming a defect includes forming a hole in the glass blank, or forming a hole and a crack that develops from the hole in the glass blank. Forming a defect includes forming a defect over the entire region of the line, i.e., forming a linear defect, as well as discretely forming defects at separate positions on the line.

That is, in the method for manufacturing a glass substrate according to the embodiment, the outer portion and the inner portion of the glass blank are separated from each other by heating the outer portion, which is on the outer side of the line along which the defect is formed, more than the inner portion, which is on the inner side of the line.

Note that holes that are formed through laser beam irradiation are preferably holes that extend through the glass blank (in the thickness direction of the glass blank) through abrasion, i.e., through-holes. If through-holes are formed, the outer portion and the inner portion can be easily separated from each other when the outer portion of the glass blank is heated. The through-holes extend substantially orthogonally with respect to main surfaces of the glass blank (at an angle of 85 to 95 degrees). Accordingly, a separation surface at which the outer portion and the inner portion separate from each other is a wall surface that is substantially orthogonal to the main surfaces of the glass blank, and differs from a wall surface that inclines with respect to the main surfaces, such as a split surface formed using a conventional scriber.

Figure 1:
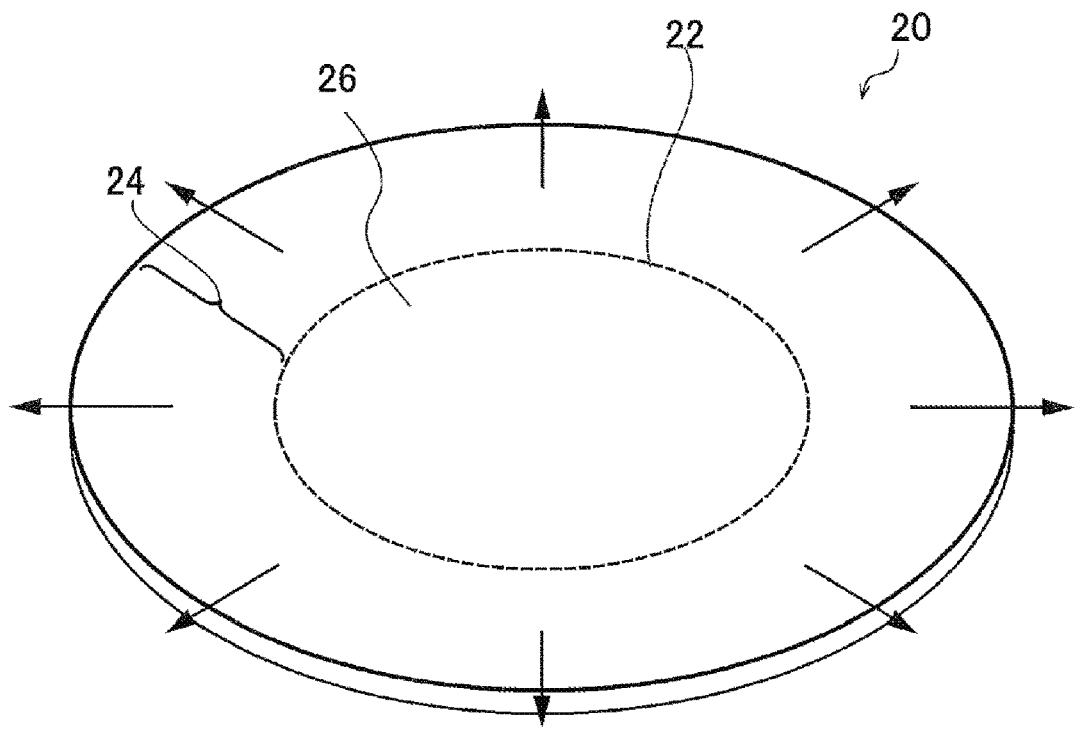
FIG. 1 is a diagram showing heating of an outer portion in a method for manufacturing a glass substrate according to an embodiment.

FIG. 1 is a diagram showing the heating of the outer portion in a method for manufacturing a glass substrate according to an embodiment. A glass blank 20 is a glass plate that has a substantially circular shape or a substantially elliptical shape, and has a constant thickness. A defect is formed on a line 22 having an annular shape in a surface of the glass blank 20 by irradiating the line 22 with a laser beam. Furthermore, the glass blank 20 in which the defect has been formed is heated to take out a portion that is to be formed into a glass substrate from the glass blank 20. At this time, an outer portion 24 is heated more than an inner portion 26 is to make the amount of thermal expansion of the outer portion 24 larger than the amount of thermal expansion of the inner portion 26. As a result, thermal expansion of the outer portion 24 occurs outward as shown in FIG. 1. Therefore, a gap can be securely formed at the interface between the outer portion 24 and the inner portion 26. Accordingly, the outer portion 24 and the inner portion 26 can be securely separated from each other. Specifically, as a result of the outer portion 24 being heated more than the inner portion 26 is, thermal expansion occurs such that the diameter of the inner circumference (inner diameter) of the outer portion 24 becomes relatively large when compared to the diameter of the outer circumference (outer diameter) of the inner portion 26, whereby the gap is formed. Accordingly, the outer portion 24 and the inner portion 26 can be securely separated from each other by the formed gap. Note that heating the outer portion 24 more than the inner portion 26 includes a case where the outer portion 24 and the inner portion 26 are heated to different degrees, as well as a case where the outer portion 24 is selectively heated but the inner portion 26 is not intentionally heated. Even if the outer portion 24 is selectively heated, the inner portion 26 is also indirectly heated through heat conduction via a space or the glass blank 20. In this case, it can be said that the outer portion 24 is heated more than the inner portion 26 is. Note that the "gap" between the inner portion and the outer portion described herein includes a measurable space that is formed at a position between the inner portion and the outer portion, as well as a state where respective surfaces of the inner portion and the outer portion that face each other are not physically or chemically bonded to each other although a measurable space is not formed. That is, the "gap" includes a microscopic space that is formed at least in a portion of the boundary between the inner portion and the outer portion.

If the inner portion 26 is heated, rather than the outer portion 24, the amount of thermal expansion of the inner portion 26 becomes larger than the amount of thermal expansion of the outer portion 24, and accordingly, the inner portion 26 presses the interface between the inner portion 26 and the outer portion 24 outward, and consequently, cracks formed through laser beam irradiation develop, and new cracks occur at the interface between the inner portion 26 and the outer portion 24. However, these cracks are pressed outward from the inner portion 26, and therefore a gap is unlikely to be formed at the interface between the inner portion 26 and the outer portion 24. Consequently, heat may be conducted from the heated inner portion 26 to the interface between the inner portion 26 and the outer portion 24 and the formed cracks may be bonded again, resulting in a failure to securely separate the inner portion and the outer portion.

In the embodiment, the outer portion 24 is heated more than the inner portion 26 on the inner side of the line 22 is, and therefore it is possible to securely form a gap and prevent a portion separated by a crack formed using the laser from being bonded again with heat.

Another embodiment is a method for manufacturing a glass substrate that includes an opening. The method for manufacturing a glass substrate includes:

(C) forming an inner circumferential portion and an outer circumferential portion that are irradiated with a laser beam along substantially concentric circles in a surface of a glass blank from which a glass substrate is obtained;

(D) separating a portion on an inner side of the outer circumferential portion of the glass blank and a portion on an outer side of the outer circumferential portion from each other by heating the portion on the outer side of the outer circumferential portion to cause thermal expansion of the portion on the outer side of the outer circumferential portion relative to the portion on the inner side of the outer circumferential portion and form a gap in the outer circumferential portion; and (E) separating a portion on an inner side of the inner circumferential portion of the glass blank and a portion on an outer side of the inner circumferential portion from each other by heating the portion on the outer side of the inner circumferential portion to cause relative thermal expansion of the portion on the outer side of the inner circumferential portion and form a gap in the inner circumferential portion.

Another embodiment is a method for manufacturing a glass substrate that includes an opening. The method for manufacturing a glass substrate includes:

(F) forming a defect on a line having a predetermined annular shape in a surface of a glass blank from which the glass substrate is obtained, by irradiating the line with a laser beam; and (G) separating an outer portion and an inner portion of the glass blank from each other by heating the outer portion more than the inner portion, the outer portion and the inner portion being respectively on an outer side and an inner side of the line of the glass blank in which the defect has been formed, wherein the outer portion and the inner portion of the glass blank are separated from each other by simultaneously heating the outer portion from both main surface sides of the glass blank to heat the outer portion more than the inner portion, and the inner portion is removed to form the opening.

Figure 2:
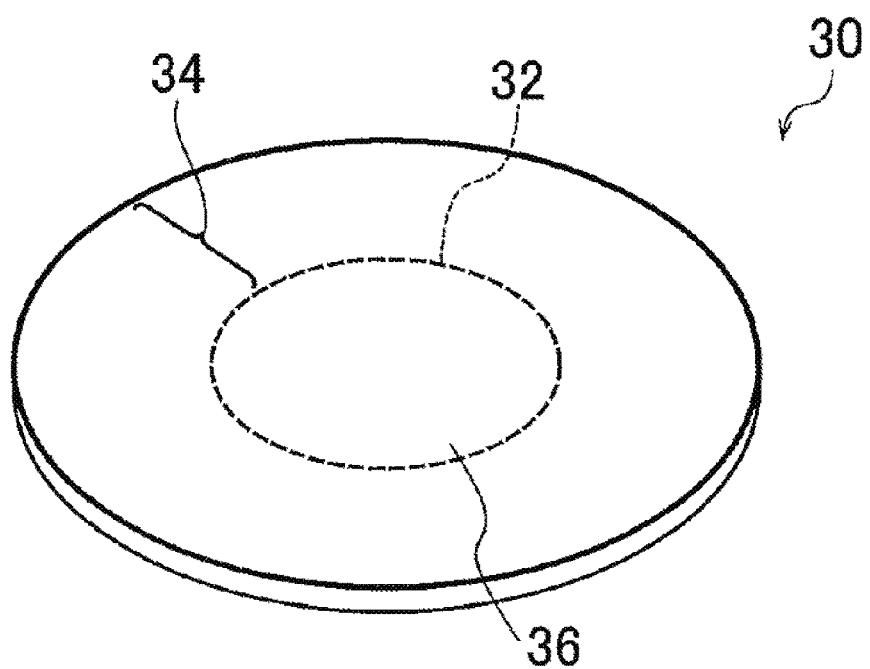
FIG. 2 is a diagram showing heating of an outer portion in a method for manufacturing a glass substrate according to another embodiment.

FIG. 2 is a diagram showing the heating of an outer portion in a method for manufacturing a glass substrate according to an embodiment. FIG. 2 shows separation that is performed through the heating described above in (E) or (G) after forming the inner circumferential portion described above in (C) in a surface of a circular glass blank 30 or forming a defect on the line having the predetermined annular shape described above in (F) by irradiating the line with a laser beam. The glass blank 30 is a plate that is taken out by forming the outer circumferential portion in the surface of the glass blank described above in (C) and separating the portion on the inner side of the outer circumferential portion and the portion on the outer side of the outer circumferential portion from each other as described above in (D).

The inner circumferential portion and the outer circumferential portion each refer to the defect formed on the line 22 in the embodiment shown in FIG. 1. Accordingly, the shape of the outer circumferential portion described above in (D) corresponds to the outer circumferential shape of the glass blank 30 shown in FIG. 2.

An outer portion 34 on the outer side of an inner circumferential portion 32 of the glass blank 30 formed through laser beam irradiation is heated to cause relative thermal expansion of the outer portion 34 and form a gap in the inner circumferential portion 32, in order to separate an inner portion 36 and the outer portion 34 from each other. The separated inner portion 36 is removed in (G) described above. If the outer portion 34 is simultaneously heated from both main surface sides of the glass blank 30 as described above in (G), the amount of thermal expansion of the portion on the outer side of the inner circumferential portion 32, which is smaller than the amount of thermal expansion of the portion on the outer side of the outer circumferential portion in the heating described above in (D), can be made substantially uniform in the thickness direction of the glass blank 30, and a gap can be uniformly formed in the thickness direction. As a result, the inner portion 36 can be taken out from the outer portion 34 even if the gap is small. The inner circumferential portion 32 corresponds to the defect formed along the line 22 in the embodiment shown in FIG. 1.

In both of the embodiment including the steps described above in (C) to (E) and the embodiment including the steps described above in (F) and (G), gaps are formed in the outer circumferential portion and the inner circumferential portion by heating the outer portions on the outer sides of the outer circumferential portion and the inner circumferential portion to cause thermal expansion of the outer portions relative to inner portions, and therefore interfaces constituted by cracks formed using a laser can be prevented from being bonded again with heat. Thus, a glass substrate including an opening can be efficiently formed.

Note that "substantially concentric" in the above description means that the amount of deviation between the center position of a circle defined by the outer circumferential portion and the center position of a circle defined by the inner circumferential portion is not larger than 20 μm, and preferably not larger than 5 μm.

Description of Specific Method for Manufacturing Glass Substrate

The following describes details of a method for manufacturing a glass substrate and a method for manufacturing a magnetic disk according to an embodiment.

Figure 3A:
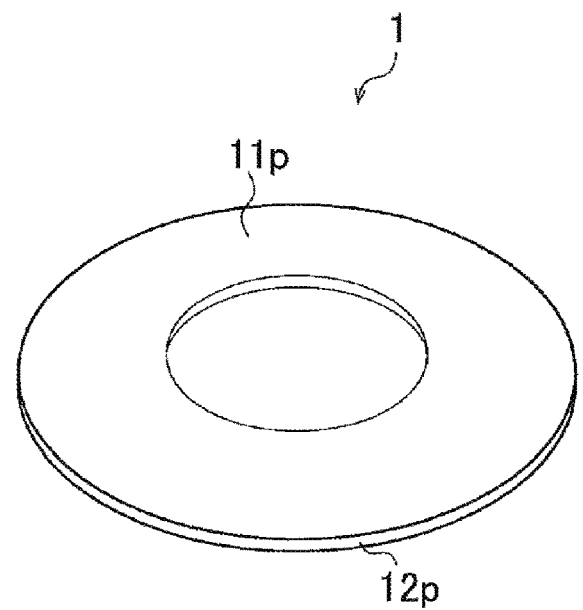
FIG. 3A is a perspective view of an example of a glass substrate for a magnetic disk manufactured according to an embodiment.
Figure 3B:
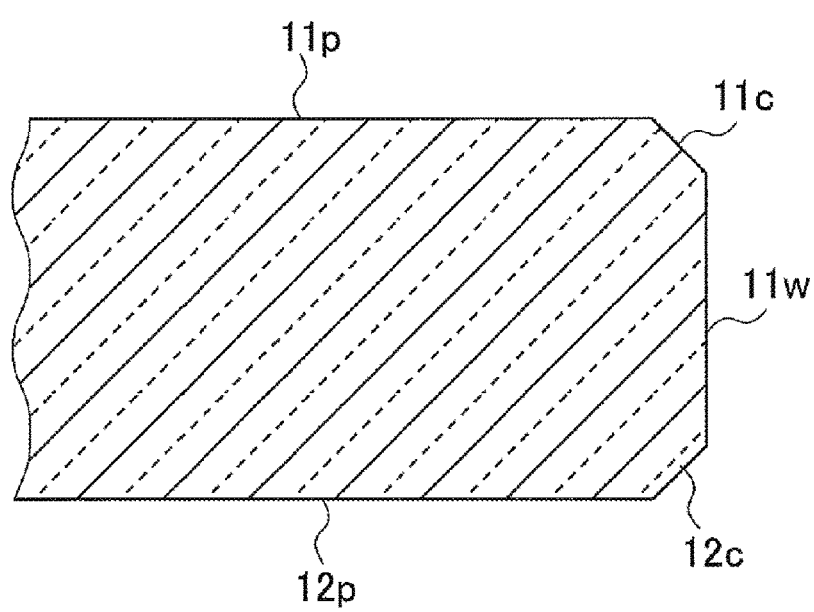
FIG. 3B is a diagram showing an example of a cross section of an outer edge surface of the glass substrate for a magnetic disk shown in FIG. 3A.

FIG. 3A is a perspective view of an example of a glass substrate for a magnetic disk manufactured in the embodiment. FIG. 3B is a diagram showing an example of a cross section of an outer edge surface of the glass substrate for a magnetic disk shown in FIG. 3A.

A glass substrate 1 shown in FIG. 3A is a glass substrate for a magnetic disk. The glass substrate 1 is a glass substrate that is constituted by an annular thin plate. Although the size of the glass substrate for a magnetic disk is not limited, the glass substrate for a magnetic disk has the size of a glass substrate for a magnetic disk that has a nominal diameter of 2.5 inches or 3.5 inches, for example. In the case of a glass substrate for a magnetic disk having a nominal diameter of 2.5 inches, the outer diameter is 65 mm, the diameter of a center hole is 20 mm to 25 mm, and the thickness is 0.3 to 0.8 mm, for example. In the case of a glass substrate for a magnetic disk having a nominal diameter of 3.5 inches, the outer diameter is 95 mm, the diameter of a center hole is 20 mm to 25 mm, and the thickness is 0.3 to 0.8 mm, for example. A magnetic disk is manufactured by forming magnetic layers on main surfaces of the glass substrate 1.

The glass substrate 1 includes a pair of main surfaces 11p and 12p, a side wall surface 11w that is formed in an outer circumferential edge surface, chamfered surfaces 11c and 12c that are respectively located between the side wall surface 11w and the main surfaces 11p and 12p, a side wall surface (not shown) that is formed in an inner circumferential edge surface similarly to the outer circumferential edge surface, and chamfered surfaces (not shown) that are respectively located between the side wall surface formed in the inner circumferential edge surface and the main surfaces 11p and 12p.

The glass substrate 1 includes a circular hole in a central portion. The side wall surface 11w includes a center position in the thickness direction of the glass substrate 1. The inclination angle of the chamfered surfaces 11c and 12c with respect to the main surfaces 11p and 12p is not specifically limited, and is 45°, for example. The shape of boundaries between the side wall surface 11w and the chamfered surfaces 11c and 12c is not limited to a shape that includes an edge as illustrated, and may also be a smooth continuously curved shape.

Figure 4:
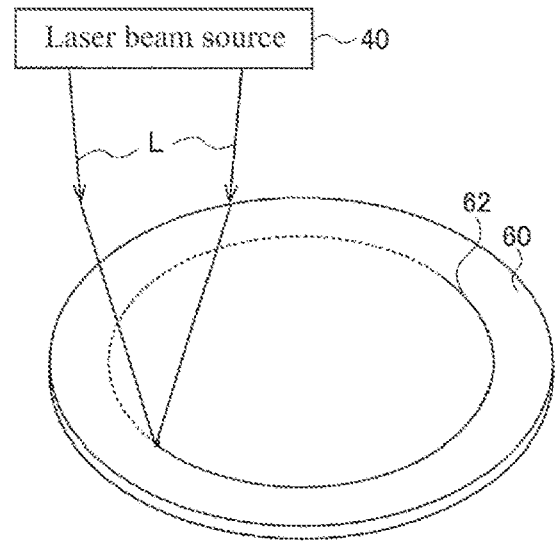
FIG. 4 is a diagram showing laser beam irradiation in a method for manufacturing a glass substrate according to an embodiment.

As shown in FIG. 1 or 2, such a glass substrate 1 is taken out using a laser beam from a glass blank 20 or 30 that is manufactured in advance. FIG. 4 is a diagram showing laser beam irradiation in a method for manufacturing a glass substrate according to an embodiment.

A glass blank 60 shown in FIG. 4, which is irradiated with a laser beam L, is a glass plate that is manufactured using a floating method or a down draw method, for example, and has a constant thickness. Alternatively, the glass blank 60 may also be a glass plate that is obtained by subjecting a mass of glass to press molding using a mold. The thickness of the glass blank 60 is larger than a target thickness of a glass substrate for a magnetic disk, which is the end product, by an amount to be removed through grinding and polishing, which is about several micrometers, for example.

A laser beam source 40 is an apparatus that emits the laser beam L, and a solid-state laser such as a YAG laser or an ND:YAG laser is used, for example. Therefore, according to an embodiment, the wavelength of the laser beam is preferably in a range of 1030 nm to 1070 nm, for example.

The laser beam L is a pulsed laser, and according to an embodiment, the pulse width of the laser beam L is preferably not larger than $10^{-12}$ seconds (not larger than 1 picosecond) in terms of suppressing excessive alteration of glass at a focal position of the laser beam L.

Light energy of the laser beam L can be appropriately adjusted according to the pulse width and the repetition frequency of the pulse width. If light energy that is excessively high relative to the pulse width and the repetition frequency is provided, the glass is likely to be excessively altered and a residue is likely to remain at the focal position.

According to an embodiment, the laser beam source 40 separates an oscillated laser beam into two light fluxes, and emits the laser beam L toward the glass blank 60 while inclining the laser beam L relative to the normal direction of a main surface of the glass blank 60 such that the two light fluxes intersect with each other at the surface of the glass blank 60 or inside the glass blank 60. As a result of the laser beam L being emitted as described above, intersections between the light fluxes are continuously formed along the thickness direction of the glass blank 60 at a point on a line 62 on the glass blank 60, and accordingly, light energy is concentrated on a line along the depth direction, and a portion of the glass blank 60 turns into plasma, whereby a hole or a through-hole can be formed.

According to an embodiment, it is preferable to emit the laser beam L toward the glass blank 60 using a burst pulse method in which a collection of light pulses successively generated at constant time intervals is taken to be a unit, and a plurality of collections of light pulses are intermittently generated. In such a case, it is also preferable that light energy of a pulse is variable in a collection of light pulses.

An example of emission of such a laser beam L is disclosed in Japanese Patent No. 5959597.

In the emission of the laser beam L using the laser beam source 40, a line that has a predetermined annular shape is irradiated with the laser beam L while moving the laser beam L relative to the glass blank 60. Thus, a defect is formed on the line. For example, an inner circumferential portion or an outer circumferential portion can be formed in the glass blank 60. In the emission of the laser beam L, the laser beam L may be moved without moving the glass blank 60, or the glass blank 60 may be moved without moving the laser beam L.

If holes are intermittently formed at discrete positions on the line 62 by emitting the laser beam L, for example, cracks are likely to be formed so as to develop from each hole toward adjacent holes, and accordingly, an outer portion and an inner portion can be easily separated from each other by heating the outer portion on the outer side of the inner circumferential portion or the outer circumferential portion, even if the line is not irradiated again with another type of laser beam. That is, the outer portion and the inner portion can be easily separated from each other by heating the outer portion of the glass blank 60 while maintaining the defect formed through irradiation with the laser beam L. In particular, if the outer portion is simultaneously heated from both main surface sides of the glass blank 60, the outer portion and the inner portion can be more easily separated from each other.

Figure 5:
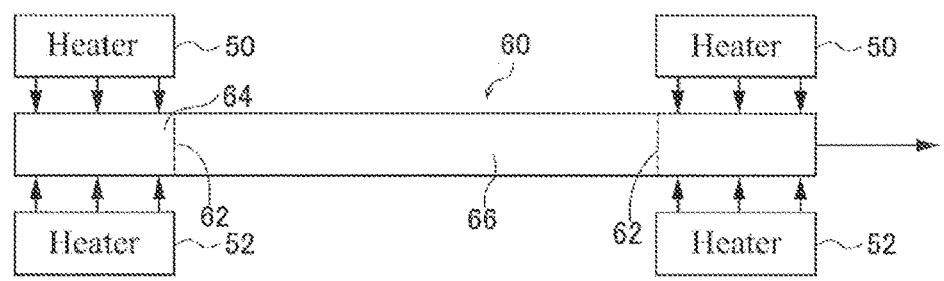
FIG. 5 is a diagram specifically showing heating of a glass blank in a method for manufacturing a glass substrate according to an embodiment.

Next, out of the outer portion and the inner portion that are respectively on the outer side and the inner side of the line of the glass blank 60 in which the defect has been formed, the outer portion is heated more than the inner portion is, or the outer portion is heated, to separate the outer portion and the inner portion of the glass blank 60 from each other. FIG. 5 is a diagram specifically showing heating of the glass blank 60 in a method for manufacturing a glass substrate according to an embodiment. In the heating of the glass blank 60, an outer portion 64 on the outer side of the line 62 on the glass blank 60 in which the defect has been formed is placed in a heating space between heaters 50 and 52, and an inner portion 66 is placed outside the heating space, for example. Thus, the outer portion 64 can be heated. At this time, the outer portion 64 is heated more than the inner portion 66 is, and accordingly, the amount of thermal expansion of the outer portion 64 is larger than the amount of thermal expansion of the inner portion 66. As a result, thermal expansion of the outer portion 64 occurs outward as shown in FIG. 5. Therefore, a gap can be securely formed at the interface between the outer portion 64 and the inner portion 66. Accordingly, the outer portion 64 and the inner portion 66 can be securely separated from each other.

Figure 6:
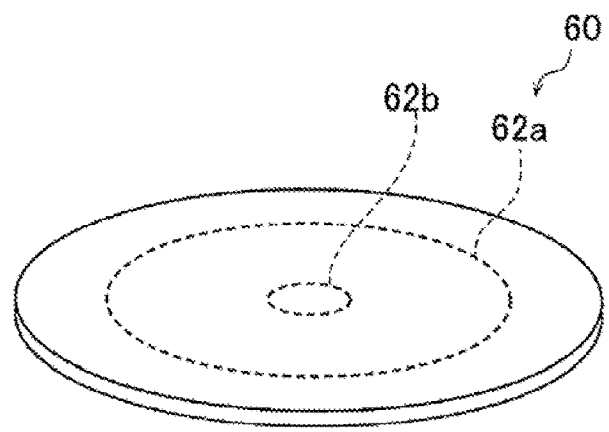
FIG. 6 is a diagram showing laser beam irradiation in a method for manufacturing a glass substrate according to an embodiment.

Note that in the example shown in FIGS. 4 and 5, the laser beam L is emitted along the annular line to form a defect portion, and thereafter processing for heating the outer portion 64 on the outer side of the line is performed, but as shown in FIG. 6, it is also possible to irradiate the glass blank 60 with the laser beam L along circular arcs of two different concentric circles to form an outer circumferential portion 62a and an inner circumferential portion 62b as two defect portions, thereafter heat a portion on the outer side of the outer circumferential portion 62a, and heat a portion on the outer side of the inner circumferential portion 62b. FIG. 6 is a diagram showing laser beam irradiation in a method for manufacturing a glass substrate according to an embodiment.

As described above, when separating the outer portion 64 and the inner portion 66 from each other, the temperature of the outer portion 64 is made higher than the temperature of the inner portion 66 to cause thermal expansion of the outer portion 64 relative to the inner portion 66 and form a gap along the line 62, whereby the outer portion 64 and the inner portion 66 are separated from each other, and therefore, a portion that is to be formed into the glass substrate can be securely taken out from the glass blank.

In particular, after the inner circumferential portion 62b is formed, if the portion on the outer side of the inner circumferential portion 62b is simultaneously heated from both main surface sides of the glass blank 60, the amount of thermal expansion becomes uniform in the thickness direction of the glass blank 60, and accordingly, a uniform gap can be formed. In particular, the inner circumferential portion 62b is close to a center position of the glass blank 60, and therefore, when compared to the outer circumferential portion 62a, the amount of thermal expansion is small even if heating is performed to a degree that is equivalent to the degree of heating of the portion on the outer side of the outer circumferential portion 62a. Therefore, it is preferable to precisely form a gap for securely taking out the portion that is to be formed into the glass substrate from the glass blank. For the reason described above, it is preferable to simultaneously heat the portion on the outer side of the inner circumferential portion 62b from both main surface sides of the glass blank 60 to make the amount of thermal expansion uniform in the thickness direction.

The glass substrate 1 has an annular shape including an opening. When manufacturing such a glass substrate 1, it is preferable to form a defect by emitting the laser beam L, taking the shape of an outer edge of the annular shape including an opening to be the shape of the line 62 (see FIG. 4), and thereafter perform first heating processing in which the outer portion 64 (a first outer portion) is heated more than the inner portion 66 (a first inner portion) is. When compared to an outer circumferential edge surface that is formed through mechanical splitting by using a conventional scriber, an outer circumferential edge surface that is formed using the laser beam L and constitutes the outer edge of the glass substrate 1 has a small surface roughness that satisfies a surface roughness that is required for an outer circumferential cross section of a glass substrate for a magnetic disk used in a hard disk drive apparatus, for example, and therefore edge surface polishing need not be performed, or even if edge surface polishing is performed, the polishing can be performed in a short time. Therefore, the outer edge of the glass substrate 1 can be efficiently formed.

In this case, it is preferable that in the glass blank 60, the outer portion 64 (the first outer portion) and the inner portion 66 (the first inner portion) are separated from each other with a length of 0.1% to 5% of the outer diameter of the annular shape left as a margin for the annular shape of the glass substrate 1. If the margin is large, waste increases as a result of a large portion of the glass blank 60 being disposed of, and the time it takes to cause a predetermined amount of thermal expansion through heating becomes long since heat is likely to diffuse through conduction, and therefore a large margin is not preferable in terms of productivity.

When forming the opening (inner hole) of the glass substrate 1, it is preferable to form a defect by emitting the laser beam L, taking the shape of an inner edge of the annular shape including the opening to be the shape of the line 62, and thereafter perform second heating processing in which the outer portion 64 (a second outer portion) is heated more than the inner portion 66 (a second inner portion) is. When compared to an inner circumferential edge surface that is formed through mechanical splitting by using a conventional scriber, an inner circumferential edge surface that is formed using the laser beam L and constitutes the inner edge of the glass substrate 1 has a small surface roughness that satisfies a surface roughness that is required for an inner circumferential cross section of a glass substrate for a magnetic disk that comes into contact with a rotary shaft in a hard disk drive apparatus, for example, and therefore edge surface polishing need not be performed, or even if edge surface polishing is performed, the polishing can be performed in a short time. Therefore, the opening of the glass substrate 1 can be efficiently formed.

At this time, it is preferable to perform the above-described second heating processing after the above-described first heating processing. The inner portion 66 in the first heating processing constitutes the outer portion 64 in the second heating processing. In the first heating processing, the inner portion 66 is not heated, or even if the inner portion 66 is heated, the inner portion 66 is heated less than the outer portion 64 is. However, the temperature of the inner portion 66 increases as a result of heat being conducted from the outer portion 64 that is heated. Therefore, if the inner portion 66 having the increased temperature is heated as the outer portion 64 in the second heating processing, the time it takes to cause a predetermined amount of thermal expansion through heating can be reduced. Thus, the glass substrate 1 can be efficiently manufactured.

Irradiating the glass blank 60 with the laser beam L may also include forming spot-like through-holes at a plurality of discrete points on a line using a pulsed laser beam, and thereafter emitting a laser beam that is different from the pulsed laser beam while continuously moving an irradiation position along the line so as to connect the discrete points on the line. In this case, cracks or latent cracks can be formed between adjacent through-holes among the plurality of through-holes formed using the pulsed laser beam, and thereafter the cracks or developed cracks can be connected between the through-holes using the other type of laser beam, and therefore shape processing of the glass blank can be efficiently performed in a short time. A $CO_2$ laser can be used as the other type of laser beam, for example. With this laser beam, a linear defect can be formed by connecting intermittently formed defects.

That is, it is also possible to securely form cracks by intermittently forming defects at discrete positions on the line 62 by emitting the laser beam L, and thereafter forming a linear detect by connecting the intermittently formed defects using the $CO_2$ laser as the other type of laser beam. As a result, the outer portion and the inner portion can be securely separated from each other through heating, which will be described later.

Note that heating the glass blank 60 after irradiation with the laser beam L preferably includes heating both main surfaces of the glass blank 60 with radiant heat from heat sources that are provided on both main surface sides of the glass blank 60. If heating is performed using radiant heat, the temperature of the glass blank 60 increases as a result of heat being conducted from the main surfaces of the glass blank 60, and accordingly, the temperature of the interface between the outer portion 64 and the inner portion 66 does not become a temperature at which the outer portion and the inner portion are bonded again. Therefore, a gap can be formed at the interface through thermal expansion of the outer portion 64.

It is preferable that the ratio of the area of a main surface of the glass blank 60 to the area of a main surface of the glass substrate 1 is 101% to 160%, and a single glass substrate 1 is taken out from a single glass blank 60 when the outer portion 64 and the inner portion 66 are separated from each other. If a plurality of glass substrates 1 are taken out from a large glass blank 60, the glass substrates 1 have a large difference in thickness due to a variation in the thickness of the glass blank 60 depending on positions. In particular, it is preferable that glass substrates for magnetic disks have a uniform thickness, and accordingly, the extents of grinding and polishing performed on the main surfaces of the glass substrates need to be adjusted between the glass substrates, which is troublesome. Furthermore, the glass blank 60 can be precisely irradiated with the laser beam while being rotated, and the glass blank 60 can be more easily handled when the outer portion is heated to separate the outer portion and the inner portion from each other. As described above, in terms of manufacturing efficiency of the glass substrate 1, it is preferable to use a glass blank 60 that is small enough to ensure a constant thickness and to take out a single inner portion from the single glass blank 60. Also, in a case where a single glass plate is taken out from a large glass blank 60, the temperature of an entire outer portion of the large glass blank 60 is increased through heating, and the temperatures of the outer portion and the inner portion are still high when the glass plate is to be taken out from the portion having the increased temperature, and accordingly, the outer portion needs to be heated to a higher temperature to achieve the predetermined amount of thermal expansion, which is not preferable.

According to an embodiment, the thickness of the glass blank 60 is not larger than 0.6 mm. A glass substrate 1 that is manufactured from the glass blank 60 having such a thickness can be effectively used as a glass substrate for a magnetic disk. If the thickness of a glass substrate for a magnetic disk is reduced, the number of magnetic disks installed in a hard disk device can be increased to increase the storage capacity thereof. Furthermore, the glass blank 60 having a thickness not larger than 0.6 mm is extremely thin, and cracks are likely to occur in the processing for separating the outer portion and the inner portion from each other through laser irradiation and heating. Therefore, the effects of the present embodiment, which makes it possible to securely separate and take out a glass substrate from a glass blank, are more noticeable in a case where the glass blank is thin.

Various types of processing are performed on the glass substrate obtained through the shape processing as described above, to impart characteristics suited to the end product.

Chamfering is performed to chamfer corner portions that are formed by the main surfaces and the outer and inner circumferential edge surfaces (edge surfaces that constitute the interface between the outer portion 64 and the inner portion 66 described above) of the glass substrate taken out from the glass blank 60 as described above. According to an embodiment, the corner portions are chamfered using a laser beam of a different type from the laser beam L. The laser beam is emitted from a direction that is inclined at an angle of 30° to 60° with respect to the main surfaces to heat the corner portions, and thus the corner portions are heated, softened, evaporated, and chamfered. A $CO_2$ laser can be preferably used, for example. Chamfered surfaces that have a small surface roughness and a high degree of roundness can be formed through the above-described chamfering.

Thus, the corner portions formed by the inner or outer circumferential edge surface and the main surfaces can be chamfered using the laser beam. Since the corner portions are chamfered using the laser beam, manufacturing efficiency is high, when compared to a case where chamfering is performed using a grindstone or the like.

Edge surface polishing is not performed in the processes from taking out the glass substrate having a predetermined shape from the glass blank 60 to chamfering of the corner portions of the glass substrate, and accordingly manufacturing efficiency is improved.

Grinding/polishing processing is performed on the main surfaces of the obtained glass substrate 1.

In the grinding/polishing processing, the glass substrate 1 is ground and then polished.

In grinding processing, grinding is performed on the main surfaces of the glass substrate 1 using a double-side grinding apparatus provided with a planetary gear mechanism. Specifically, both main surfaces of the glass substrate 1 are ground while the outer circumferential edge surface of the glass substrate 1 is held in a holding hole provided in a holding member of the double-side grinding apparatus. The double-side grinding apparatus includes a pair of upper and lower surface plates (an upper surface plate and a lower surface plate), and the glass substrate 1 is sandwiched between the upper surface plate and the lower surface plate. The glass substrate 1 and the surface plates are moved relative to each other by moving one or both of the upper surface plate and the lower surface plate while supplying a coolant, and thereby both main surfaces of the glass substrate 1 can be ground. The grinding processing can be performed in a state where grinding members obtained by forming fixed abrasive particles, which are obtained by fixing diamonds using resin, into a sheet-shape are attached to the surface plates, for example.

Next, first polishing is performed on the ground main surfaces of the glass substrate 1. Specifically, both main surfaces of the glass substrate 1 are polished while the outer circumferential edge surface of the glass substrate 1 is held in a holding hole provided in a carrier for polishing of a double-side polishing apparatus. The first polishing is for removing blemishes and warping or adjusting minute surface unevenness (microwaviness, roughness) remaining on the main surfaces after the grinding processing.

In the first polishing processing, the glass substrate 1 is polished using a double-side polishing apparatus having a configuration similar to that of the double-side grinding apparatus used in the above-described grinding processing with fixed abrasive particles, while a polishing slurry is provided. In the first polishing processing, a polishing slurry containing loose abrasive particles is used. Cerium oxide abrasive particles, zirconia abrasive particles, etc., are used as the loose abrasive particles in the first polishing, for example. Similarly to the double-side grinding apparatus, the double-side polishing apparatus sandwiches the glass substrate 1 between a pair of upper and lower surface plates. Tabular polishing pads (resin polisher, for example) having an annular shape overall are attached to the upper surface of the lower surface plate and the bottom surface of the upper surface plate. The glass substrate 1 and the surface plates are moved relative to each other by moving one or both of the upper surface plate and the lower surface plate, and thereby both main surfaces of the glass substrate 1 are polished. It is preferable that abrasive polishing particles have an average particle diameter (D50) in a range of 0.5 to 3 μm.

After the first polishing, the glass substrate 1 may be chemically strengthened. In this case, a melt in which potassium nitrate and sodium sulfate are mixed is used as a chemical strengthening liquid, for example, and the glass substrate 1 is immersed in the chemical strengthening liquid. Thus, a compressive stress layer can be formed on the surface of the glass substrate 1 through ion exchange.

Next, second polishing is performed on the glass substrate 1. The second polishing processing is for mirror-polishing the main surfaces. In the second polishing as well, a double-side polishing apparatus having a configuration similar to that of the double-side polishing apparatus used in the first polishing is used. Specifically, both main surfaces of the glass substrate 1 are polished while the outer circumferential edge surface of the glass substrate 1 is held in a holding hole provided in a carrier for polishing of the double-side polishing apparatus. The second polishing processing differs from the first polishing processing in that the type and particle size of the loose abrasive particles are different, and the hardness of the resin polishers is different. The hardness of the resin polishers is preferably lower than that of the resin polishers used in the first polishing processing. For example, a polishing liquid containing colloidal silica as loose abrasive particles is supplied between the polishing pads of the double-side polishing apparatus and the main surfaces of the glass substrate 1 to polish the main surfaces of the glass substrate 1. It is preferable that the abrasive polishing particles used in the second polishing have an average particle diameter (d50) in a range of 5 to 50 nm.

Whether or not to perform chemical strengthening processing may be appropriately selected taking the glass composition or the necessity into account. Another type of polishing processing may be added to the first polishing processing and the second polishing processing, and two types of polishing processing performed on the main surfaces may be performed as single polishing processing. The order of the above-described processing may be appropriately changed.

As a result of the main surfaces of the glass substrate 1 being polished as described above, a glass substrate for a magnetic disk that satisfies requirements for glass substrates for magnetic disks can be obtained.

Thereafter, a magnetic disk is manufactured by forming at least a magnetic layer on the manufactured glass substrate 1 having the polished main surfaces.

Note that edge surface polishing processing for polishing edge surfaces of the glass substrate 1 may also be performed before the first polishing, for example, after the grinding and before the first polishing, or before the grinding.

Even if such edge surface polishing processing is performed, the edge surface polishing processing takes a short time because the arithmetic average roughness Ra of the edge surfaces of the glass substrate 1, which has been taken out from the glass blank 60 using the laser beam, is smaller than 0.01 μm and the roundness is not larger than 15 μm.

The edge surface polishing processing may be performed using a polishing brush method in which polishing is performed using a polishing brush while loose abrasive particles are supplied to the edge surfaces or a polishing method in which a magnetic functional fluid is used. In the polishing method in which a magnetic functional fluid is used, a slurry obtained by adding abrasive polishing particles to a magnetic viscous fluid is formed into a mass using a magnetic field, the edge surfaces of the glass substrate 1 are thrusted into the mass, and the edge surfaces are polished by moving the mass and the glass substrate relative to each other.

However, it is preferable not to perform the edge surface polishing processing to increase manufacturing efficiency. In this case, the main surfaces of the glass substrate 1 are ground or polished in the grinding/polishing processing of the main surfaces while maintaining the roundness of the glass substrate 1 taken out from the glass blank 60 and the surface roughness of at least a portion of a split surface.

Although the composition of the glass substrate 1 is not limited, the following composition is preferable.

Specifically, the glass substrate is preferably amorphous aluminosilicate glass that has the following composition in which ratios of components are shown in terms of oxides using mol %: 50 to 75% of $SiO_2$, 1 to 15% of $Al_2O_3$, a total of 5 to 35% of at least one component selected from $Li_2O$, $Na_2O$, and $K_2O$, a total of 0 to 20% of at least one component selected from MgO, CaO, SrO, BaO, and ZnO, and a total of 0 to 10% of at least one component selected from $ZrO_2$, $TiO_2$, $La_2O_3$, $Y_2O_3$, $Ta_2O_5$, $Nb_2O_5$, and $HfO_2$.

Preferably, the glass substrate 1 may be, for example, amorphous aluminosilicate glass that has the following composition in which ratios of components are shown using mass %: 57 to 75% of $SiO_2$, 5 to 20% of $Al_2O_3$ (under the provision that a total of $SiO_2$ and $Al_2O_3$ is 74% or more), a total of more than 0% and not more than 6% of $ZrO_2$, $HfO_2$, $Nb_2O_5$, $Ta_2O_5$, $La_2O_3$, $Y_2O_3$, and $TiO_2$, more than 1% and not more than 9% of $Li_2O$, 5 to 28% of $Na_2O$ (under the provision that a mass ratio $Li_2O/Na_2O$ is not larger than 0.5), 0 to 6% of $K_2O$, 0 to 4% of MgO, more than 0% and not more than 5% of CaO (under the provision that a total of MgO and CaO is not more than 5% and the amount of CaO is larger than the amount of MgO), and 0 to 3% of SrO+BaO.

The glass substrate 1 may have a composition that includes, as essential components, $SiO_2$, $Li_2$, $Na_2O$, and at least one alkaline earth metal oxide selected from the group consisting of MgO, CaO, SrO, and BaO, and in which the mole ratio (CaO/(MgO+CaO+SrO+BaO)) of the amount of CaO to a total amount of MgO, CaO, SrO, and BaO is not larger than 0.20, and the glass transition temperature of the glass substrate may be at least 650° C. A glass substrate 1 having such a composition is preferable as a glass substrate for a magnetic disk that is used for a magnetic disk for energy assisted magnetic recording.

Although the method for manufacturing a glass substrate and the method for manufacturing a magnetic disk according to the present invention have been described in detail, the method for manufacturing a glass substrate and the method for manufacturing a magnetic disk according to the present invention are not limited to the above-described embodiments, and it goes without saying that various modifications and changes can be made within a scope not departing from the gist of the present invention.

The invention claimed is:

1. A method for manufacturing a glass substrate that includes an opening, comprising:

forming a line of an inner circumferential portion and a line of an outer circumferential portion by irradiating a laser beam along substantially concentric circles in a surface of a glass blank from which the glass substrate is obtained;

separating a portion on an inner side of the line of the outer circumferential portion of the glass blank and a portion on an outer side of the line of the outer circumferential portion of the glass blank from each other, by selectively heating an entirety of the portion on the outer side of the line of the outer circumferential portion with radiant heat without intentionally heating the portion on the inner side of the line of the outer circumferential portion, to cause the portion on the outer side of the line of the outer circumferential portion to thermally expand outward such that a diameter of an inner circumference of the portion on the outer side of the line of the outer circumferential portion is relatively larger than a diameter of an outer circumference of the portion on the inner side of the line of the outer circumferential portion, and to form a gap along the line of the outer circumferential portion; and separating a portion on an inner side of the line of the inner circumferential portion of the glass blank and a portion on an outer side of the line of the inner circumferential portion of the glass blank from each other, by selectively heating an entirety of the portion on the outer side of the line of the inner circumferential portion with radiant heat without intentionally heating the portion on the inner side of the line of the inner circumferential portion, to cause the portion on the outer side of the line of the inner circumferential portion to thermally expand outward such that a diameter of an inner circumference of the portion on the outer side of the line of the inner circumferential portion is relatively larger than a diameter of an outer circumference of the portion on the inner side of the line of the inner circumferential portion, and to form a gap along the line of the inner circumferential portion, and the selectively heating of the entirety of the portion on the outer side of the line of the inner circumferential portion with the radiant heat is performed by placing, in a heating space between heaters for the separating of the portions on the inner and outer sides of the line of the inner circumferential portion, the portion on the outer side of the line of the inner circumferential portion, the heaters for the separating of the portions on the inner and outer sides of the line of the inner circumferential portion being provided on both main surface sides of the glass blank, being in non-contact with main surfaces of the glass blank, and emitting the radiant heat, and by placing, outside the heating space, the portion on the inner side of the line of the inner circumferential portion.

2. The method for manufacturing a glass substrate according to claim 1,
wherein the selectively heating of the portion on the outer side of the line of the outer circumferential portion with the radiant heat is performed while heaters for the separating of the portions on the inner and outer sides of the line of the outer circumferential portion, which emit the radiant heat, are in non-contact with the glass blank.

3. The method for manufacturing a glass substrate according to claim 2,
wherein the heaters for the separating of the portions on the inner and outer sides of the line of the outer circumferential portion are provided on both of the main surface sides of the glass blank.

4. The method for manufacturing a glass substrate according to claim 3,
wherein the laser is irradiated such that holes are intermittently formed at discrete positions on the line of the inner circumferential portion and the line of the outer circumferential portion.

5. The method for manufacturing a glass substrate according to claim 3,
wherein the glass blank has a thickness not larger than 0.6 mm.

6. The method for manufacturing a glass substrate according to claim 3 further comprising
grinding or polishing main surfaces of the glass substrate that includes the opening.

7. The method for manufacturing a glass substrate according to claim 2,
wherein the laser is irradiated such that holes are intermittently formed at discrete positions on the line of the inner circumferential portion and the line of the outer circumferential portion.

8. The method for manufacturing a glass substrate according to claim 2,
wherein the glass blank has a thickness not larger than 0.6 mm.

9. The method for manufacturing a glass substrate according to claim 2 further comprising
grinding or polishing main surfaces of the glass substrate that includes the opening.

10. The method for manufacturing a glass substrate according to claim 1,
wherein the laser is irradiated such that holes are intermittently formed at discrete positions on the line of the inner circumferential portion and the line of the outer circumferential portion.

11. The method for manufacturing a glass substrate according to claim 10, wherein
wherein cracks that develop from each of the holes toward adjacent holes are formed.

12. The method for manufacturing a glass substrate according to claim 11,
wherein each of the holes is a through-hole.

13. The method for manufacturing a glass substrate according to claim 10,
wherein each of the holes is a through-hole.

14. The method for manufacturing a glass substrate according to claim 10,
wherein the glass blank has a thickness not larger than 0.6 mm.

15. The method for manufacturing a glass substrate according to claim 10,
wherein after the holes are formed on the line of the outer circumferential portion, the selectively heating of the entirety of the portion on the outer side of the line of the outer circumferential portion is performed without further laser irradiation to the line of the outer circumferential portion on which the holes have been formed, and
after the holes are formed on the line of the inner circumferential portion, the selectively heating of the entirety of the portion on the outer side of the line of the inner circumferential portion is performed without further laser irradiation to the line of the inner circumferential portion on which the holes have been formed.

16. The method for manufacturing a glass substrate according to claim 1,
wherein the glass blank has a thickness not larger than 0.6 mm.

17. The method for manufacturing a glass substrate according to claim 1 further comprising
grinding or polishing main surfaces of the glass substrate that includes the opening.

18. The method for manufacturing a glass substrate according to claim 1,
wherein the glass substrate that includes the opening is a magnetic-disk glass substrate.

19. A method for manufacturing a magnetic disk, the method comprising:
forming at least a magnetic layer on a main surface of the magnetic-disk glass substrate according to claim 18.

20. The method for manufacturing a glass substrate according to claim 1,
wherein the selectively heating of the entirety of the portion on the outer side of the line of the outer circumferential portion is performed by placing, in the heating space, the portion on the outer side of the line of the outer circumferential portion, and placing, outside the heating space, the portion on the inner side of the line of the outer circumferential portion.

* * * * *